(12) United States Patent
Meyers et al.

(10) Patent No.: US 8,505,995 B2
(45) Date of Patent: Aug. 13, 2013

(54) FASCIA COUPLING BRACKET

(75) Inventors: Jason Aaron Meyers, Shelby Township, MI (US); Bradley David Smith, Hudsonville, MI (US)

(73) Assignee: Newfrey LLC, Newark, DE (US)

( * ) Notice: Subject to any disclaimer, the term of this patent is extended or adjusted under 35 U.S.C. 154(b) by 0 days.

(21) Appl. No.: 13/305,353

(22) Filed: Nov. 28, 2011

(65) Prior Publication Data

US 2013/0134732 A1 May 30, 2013

(51) Int. Cl.
*B62D 27/00* (2006.01)

(52) U.S. Cl.
USPC .......................................................... 296/29

(58) Field of Classification Search
USPC ..................... 296/29, 193.09; 293/102, 155
See application file for complete search history.

(56) References Cited

U.S. PATENT DOCUMENTS

| 1,424,395 A | 8/1922 | Evelyn |
| 1,436,994 A | 11/1922 | Lyon |
| 4,895,405 A | 1/1990 | Sasatake et al. |
| 5,462,325 A | 10/1995 | Masuda et al. |
| 6,003,933 A * | 12/1999 | Rinklin ........................ 296/198 |
| 6,010,169 A * | 1/2000 | Cox et al. ...................... 293/120 |
| 6,135,517 A * | 10/2000 | Cordebar ...................... 293/155 |
| 6,786,520 B2 | 9/2004 | Burkhardt et al. |
| 7,083,207 B2 | 8/2006 | Matsuzawa |
| 7,086,679 B2 * | 8/2006 | Andre et al. .................... 296/29 |
| 7,410,209 B2 | 8/2008 | Clapie |
| 7,793,998 B2 | 9/2010 | Matsui et al. |
| 8,226,133 B2 * | 7/2012 | Sano ............................. 293/155 |
| 2005/0062308 A1 * | 3/2005 | Pfister et al. .................... 296/29 |

FOREIGN PATENT DOCUMENTS

| JP | 2006 192935 A | 7/2006 |
| JP | 2008 105474 A | 5/2008 |
| JP | 2009 101726 A | 5/2009 |
| JP | 2009 274543 A | 11/2009 |
| WO | WO 2011/043355 A1 | 4/2011 |

* cited by examiner

*Primary Examiner* — H. Gutman
(74) *Attorney, Agent, or Firm* — Harness, Dickey & Pierce, P.L.C.

(57) ABSTRACT

A fascia fixture interposed between an extended-directional end portion of a fascia and an auto body. The fascia fixture is interposed in such a way as to be extended in the extended direction of the fascia. The extended-directional end portion of the fascia is mounted on the auto body in such a way as to comprise a part of a wheel house.

19 Claims, 11 Drawing Sheets

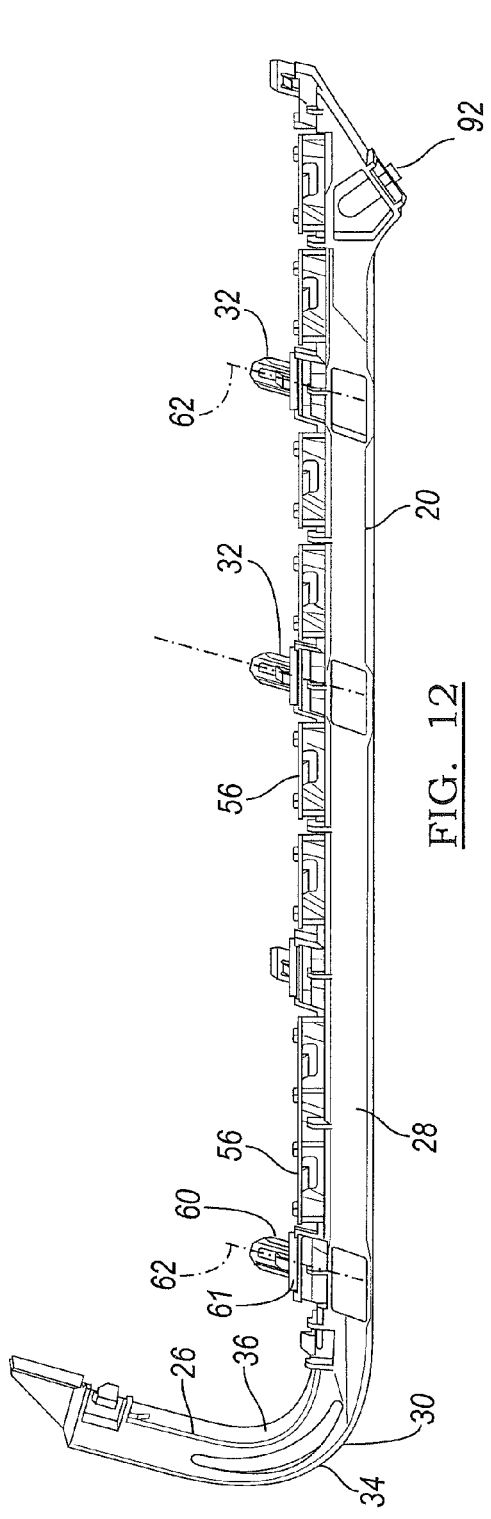
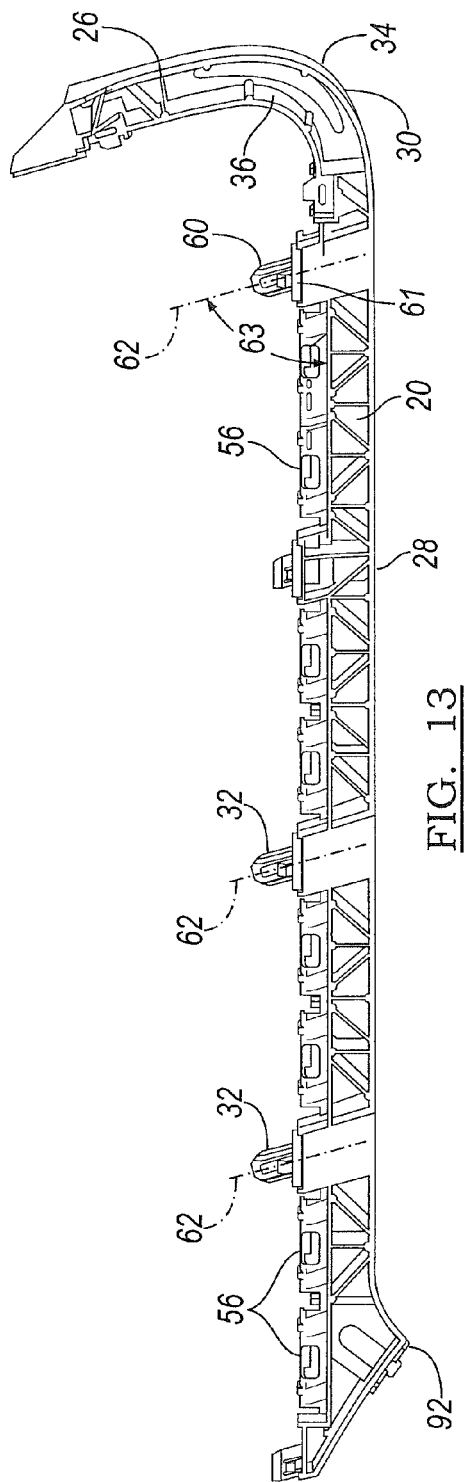
FIG. 12
FIG. 13

FASCIA COUPLING BRACKET

FIELD

The present disclosure relates to a system for coupling a fascia component to a vehicle body.

BACKGROUND

This section provides background information related to the present disclosure which is not necessarily prior art.

Conventionally, an automotive fender panel is formed of an outer plate of a fascia, coupled together via a fascia bracket made of resin to a substructure. This fascia bracket is typically mounted to the fender panel by using a bolt or a clip, or the like. Typically, a fastener component is provided at an end part of the fascia that fits into a groove which is provided in this fascia bracket so as to couple the fender panel to the fascia. Such a structure improves the workability concerning mounting and demounting of the fascia in addition to securing the coupling strength between the fender panel and the fascia.

Moreover, conventionally, when simultaneously coating the fender panel made of resin and the vehicle body frame in a vehicle assembly line, heat softens and deforms the fender panel. In order to restrict the deformation in a desired direction, the fender panel is mounted to the vehicle body frame using a dedicated sliding clip, washer, or the like.

When the plurality of members is used, it is difficult to secure parts accuracy and the alignment at the joint part between the fender panel and the fascia becomes poor. Furthermore, in a case where the fender panel is formed of resin, the rigidity at an edge is decreased as compared to its interface member made of sheet metal. As a result, this portion will deform easily, and this deformation needs to be suppressed. This problem occurs in a case where an aligning portion with the fascia, at a front part of the fender panel, is located distant from the vehicle body frame. Accordingly, the present teachings are intended to overcome the deficiencies of the prior art and to provide a fender panel structure capable of mounting a fascia to a fender panel accurately while improving the alignment at a body fascia interface.

SUMMARY

This section provides a general summary of the disclosure, and is not a comprehensive disclosure of its full scope or all of its features.

A first aspect of the present teachings includes a fascia fixture interposed between an extended-directional end portion of a fascia and an auto body. The fascia fixture is interposed in such a way as to be extended in an extended direction of the fascia. The extended-directional end portion of the fascia is mounted on the auto body in such a way as to form a portion of a wheel house. On one end of the extended-directional end portion, a mounting portion for mounting an extended-directional outer end wall of the fascia is formed. The mounting portion is configured so as to be elastically deformed by a load with more than a predetermined load to engage the wheel well.

Another aspect of the teachings includes a fascia mounting structure having a fascia fixture interposed between the extended-directional end portion of the fascia and the auto body. The fascia fixture is generally L-shaped having a deformable portion between a pair of perpendicular legs. In addition, the fascia fixture is configured to mount the extended-directional end portion of the fascia to the auto body in such a way as to comprise a pair of perpendicular surfaces in a part of the wheel house, According to the second aspect, either a locked portion or a lockable portion is provided on one side of the width direction of the fascia fixture in order to lock into another side of either the locked portion or the lockable portion formed in one side of the width direction of the fascia. Either the locked portion or the lockable portion may be set to slide, relative to the extended direction of the fascia.

According to yet another aspect of the teachings, the mounting portion can be elastically deformed by the load more than the predetermined load is formed on one of the extended-directional ends of the fascia fixture. The extended-directional outer end wall of said fascia is mounted on the fascia fixture, so that the fascia fixture according to the first aspect can solidly mount the extended-directional end portion of the fascia on the auto body.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIGS. 12 and 13 represent front and rear views of the clip according to the present teachings.

Corresponding reference numerals indicate corresponding parts throughout the several views of the drawings.

DETAILED DESCRIPTION

Figure 1:
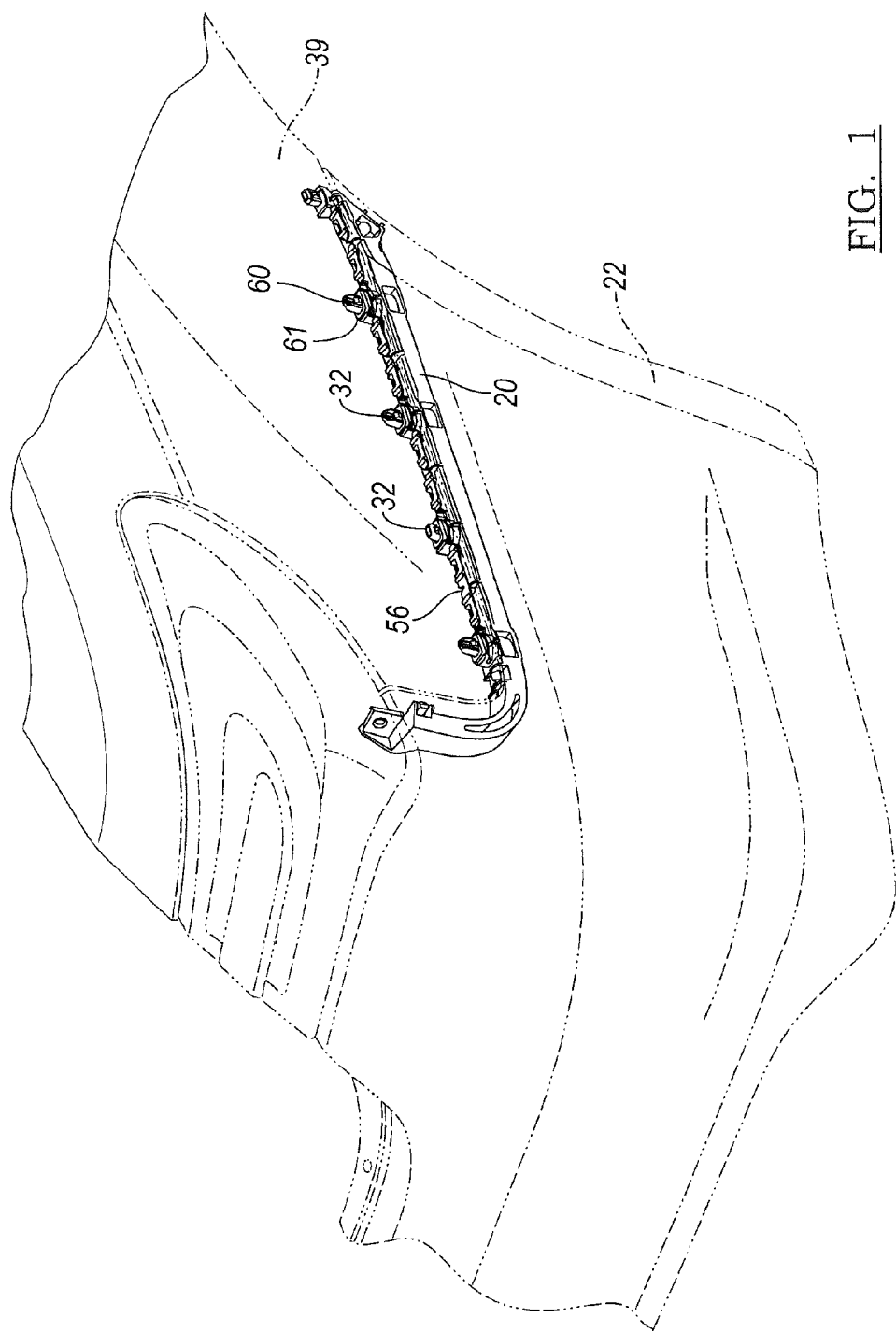
FIG. 1 is a perspective view of one embodiment of a fascia attachment clip used to mount a rear fascia of an automobile.

Example embodiments will now be described more fully with reference to the accompanying drawings.

According to the present teachings and generally shown in FIGS. 1-13, a fascia attachment clip 20 is provided for attaching and fixing a fascia component 22 to a vehicle body 24. The fascia attachment clip 20 has first 26 and second 28 sections, and an elastic portion 30 situated there between. The elastic portion 30 is elastically deformable between the first and second sections so as to allow relative movement between the first 26 and second 28 sections. Functionally, attachment parts 32 formed on the first and second sections are positioned to facilitate attaching the fascia component 22 to the vehicle body. As will be described in detail below, the attachment parts 32 are polygonal flange members which are inserted into attachment holes provided on the vehicle body 24. Optionally, the attachment parts 32 can be fixed by screws in attachment holes 40 provided on the vehicle body.

Generally, the elastic portion 30 is constituted by a pair of curved plate-shaped bodies 34, 36, which are curved so as to position the first section 26 generally perpendicular to the second section 28. The elastic section 30, disposed between the first 26 and second 28 sections, is also elastically deformable so as to allow the relative rotation between the first and second sections 26, 28 to allow for the coupling of the fascia component to the vehicle body 24. Further, when the first section 26 is coupled to the vehicle body 24, the elastic section 30 can function as a spring to bias the fascia into proper position with respect to an interface with the vehicle.

The pair of deformable planar bodies 34, 36 define an aperture 38 there between. Generally, the elastic portion 30 comprises a pair of curved plate-shaped bodies which can have an L-shaped cross-section. In addition to rotation, the aperture 38 of the elastic portion 30 is configured to allow the first and second sections 26 and 28 to translate relative to one another to compensate for dimensional variations in at least one of a fascia component 22, a vehicle body 24, and a fascia attachment clip 20.

Figure 2:
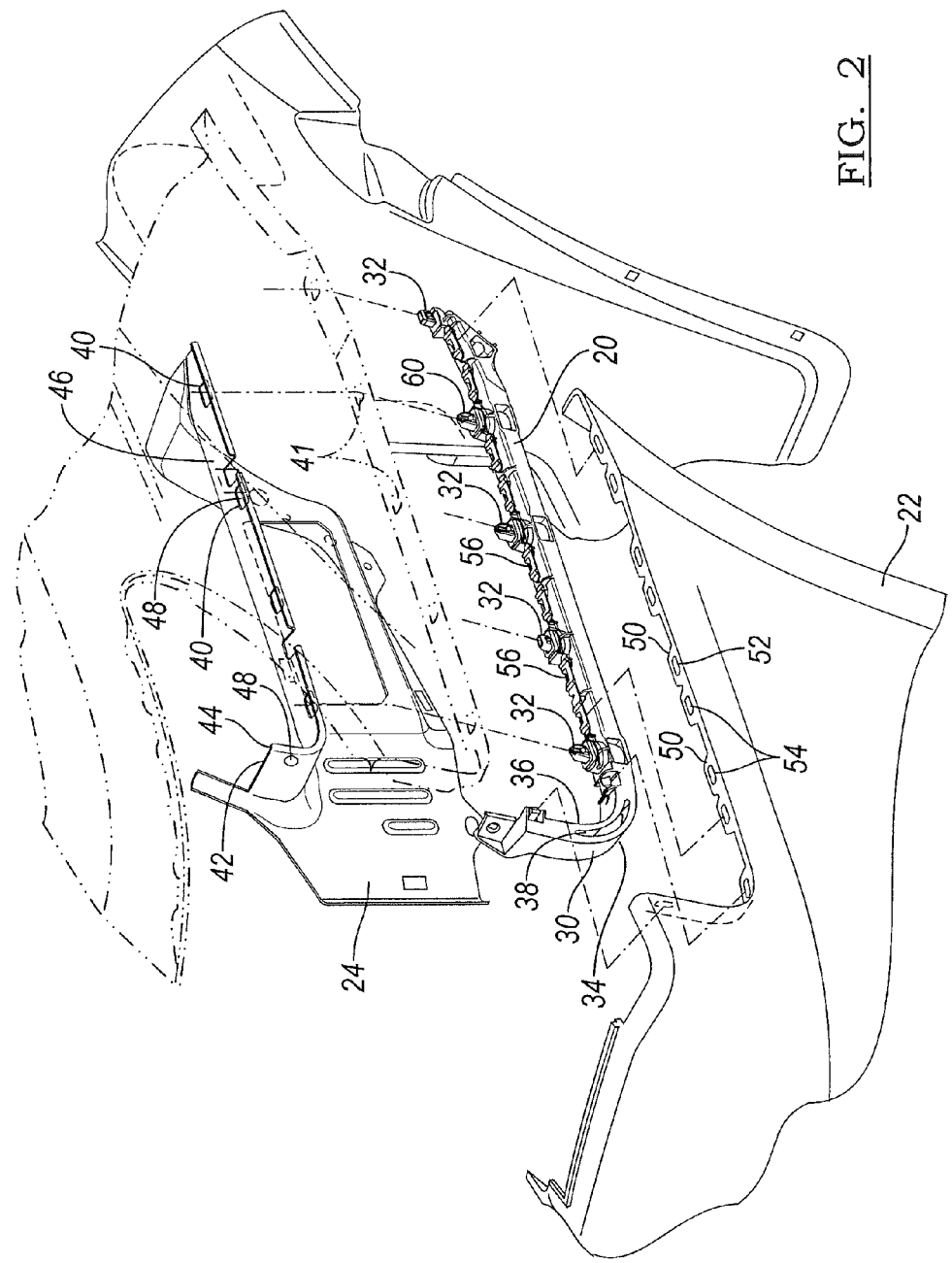
FIG. 2 is an exploded drawing of a rear fascia mounted on an auto body using the clip according to FIG. 1.

FIG. 2 represents an exploded perspective view of the assembly of FIG. 1. The vehicle body 24 has a coupling flange 42 which is generally L-shaped. The coupling flange 42 is formed of a first portion 44 which is disposed at an acute angle with respect to a second flange 46. The first portion 44 can have a first coupling feature 48 configured to accept a fastener associated with the first section 26 of the fascia attachment clip 20. The second flange portion 46 has a plurality of coupling features 48 configured to accept the attachment parts 32 associated with the second section 28 of the fascia attachment clip 20.

As best seen in FIG. 2, the fascia component 22 has a generally perpendicular flange 50. The flange 50 has a plurality of tab structures 52 defining a coupling aperture 54. These coupling apertures 54 are aligned generally with corresponding apertures 40, 41 in the sheet metal and the vehicle body 24. When assembled, the flange 50 is snapped into a plurality of snap locking elements 56 disposed on an upper surface 58 of the second section 28.

Figure 3:
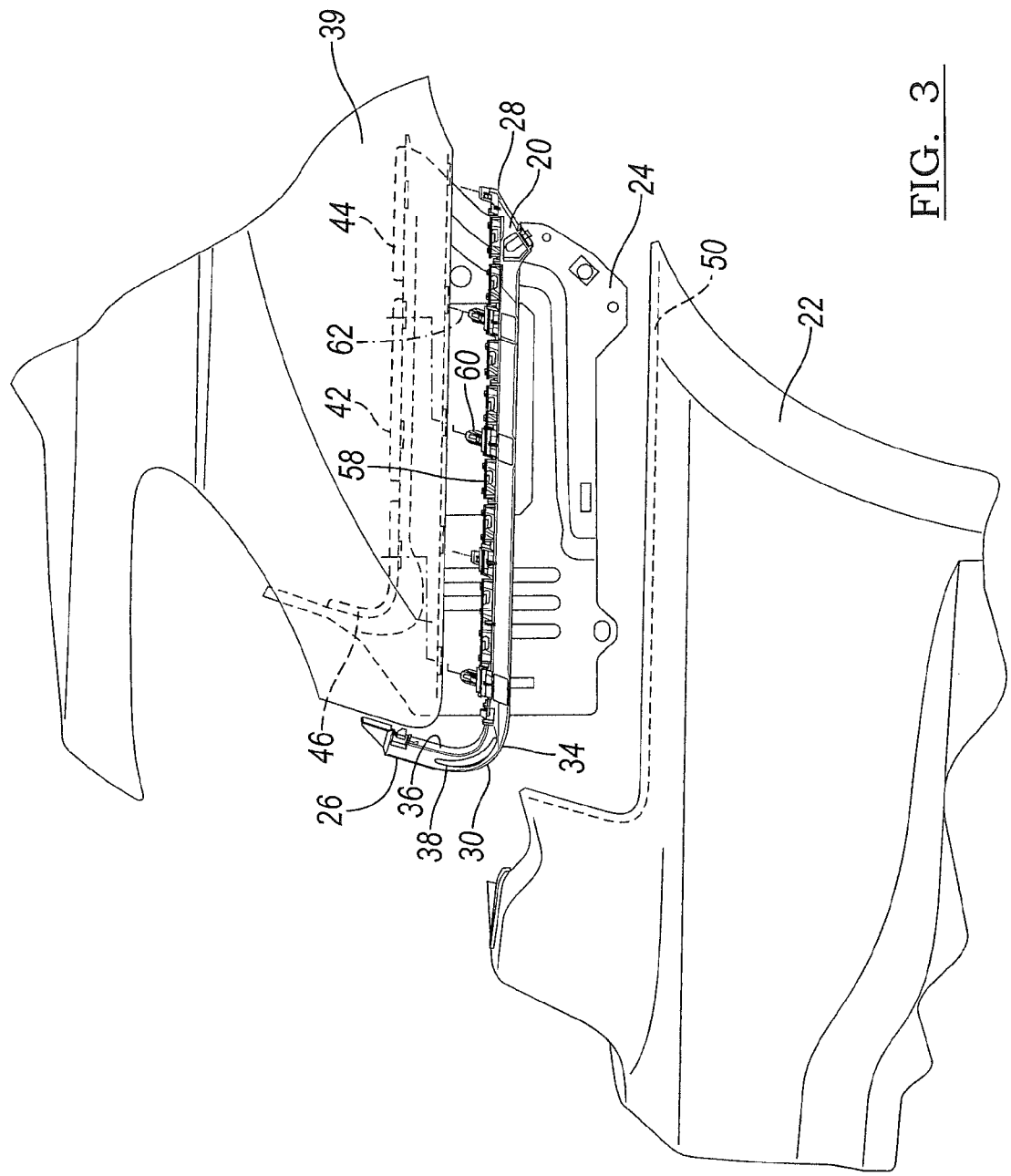
FIG. 3 is a side view of the clip according to FIG. 1.
Figure 4:
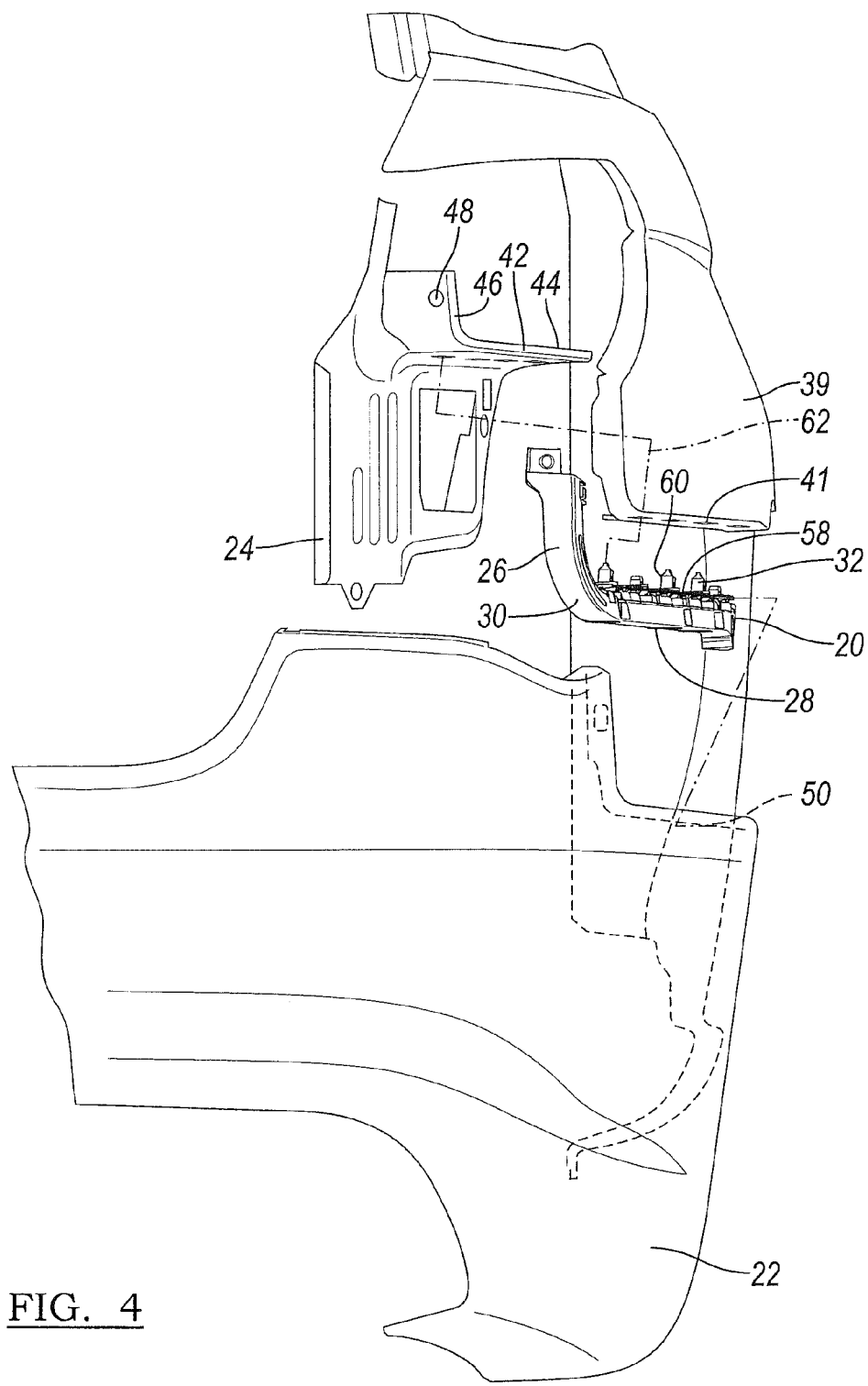
FIG. 4 is a rearview drawing of the clip in FIG. 2 viewed from a rear side of a back face.
Figure 5:
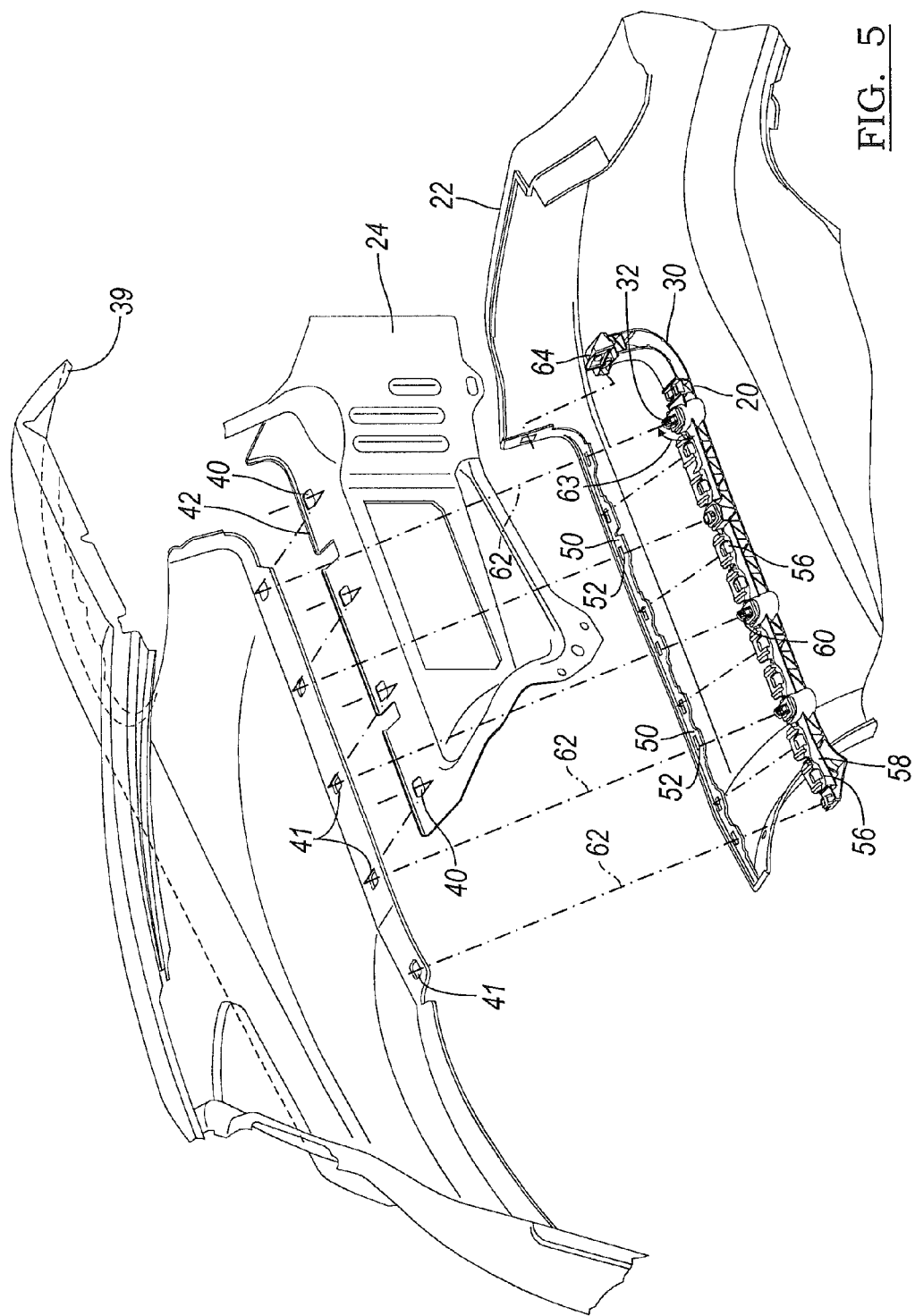
FIG. 5 is an exploded perspective view of the clip in FIG. 2 viewed from an inside back face side.

As shown in FIGS. 3-5, the attachment part 32 associated with the second section 28 of the coupling member can be an associated plurality of coupling flanges 60. These coupling flanges 60 can be polygonal and have an angle of symmetry 62 which is at a non-perpendicular angle 63 relative to the second section 28. These polygonal flanges 60 are configured to be disposed through the plurality of apertures 41 defined in the vehicle's sheet metal. The apertures 41 defined in the sheet metal can be associated with and congruent to the plurality of apertures 40 defined in the vehicle body 24. The non-perpendicular angle allows the fascia subassembly to be inserted at an angle which prevents component lock during assembly. Disposed about the coupling flange 60 and between the fascia attachment clip 20 can be an elastic grommet 61 which can function to reduce noise caused by vibration.

FIG. 5 represents an interior vehicle view of the coupling of the components. The coupling aperture 64 on the first portion 26 of the fascia attachment clip 20 accepts a fastener. The fastener allows the final coupling of the assembly to the bumper system. Shown is the insertion of the fascia attachment clip 20 along the non-perpendicular angle 63. Also shown is the alignment of the attachment holes in the sheet metal and the vehicle body.

Figure 6:
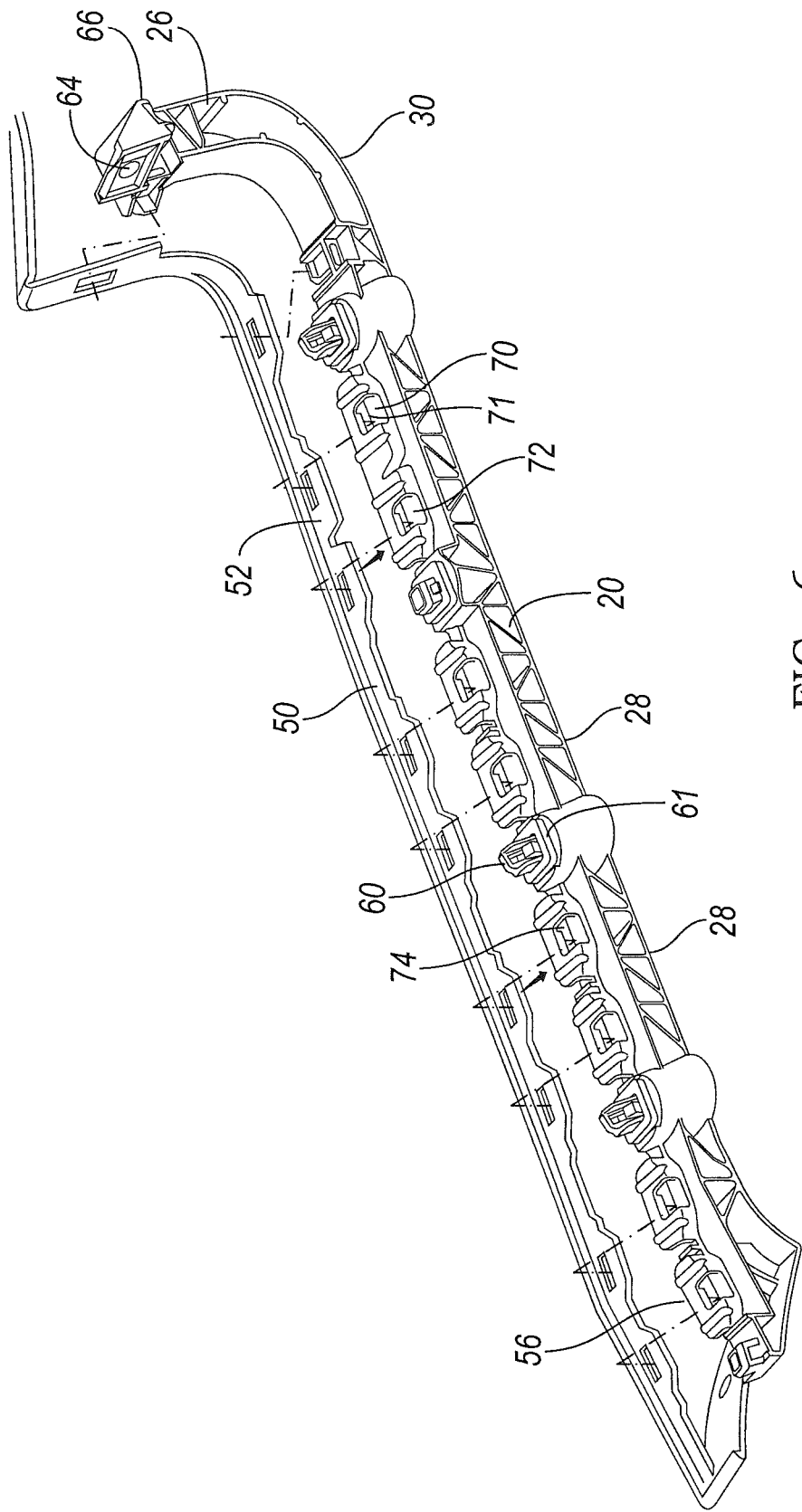
FIG. 6 is a perspective view of a mounting portion of the clip body coupled to the fascia according to the clip of FIG. 1.
Figure 7:
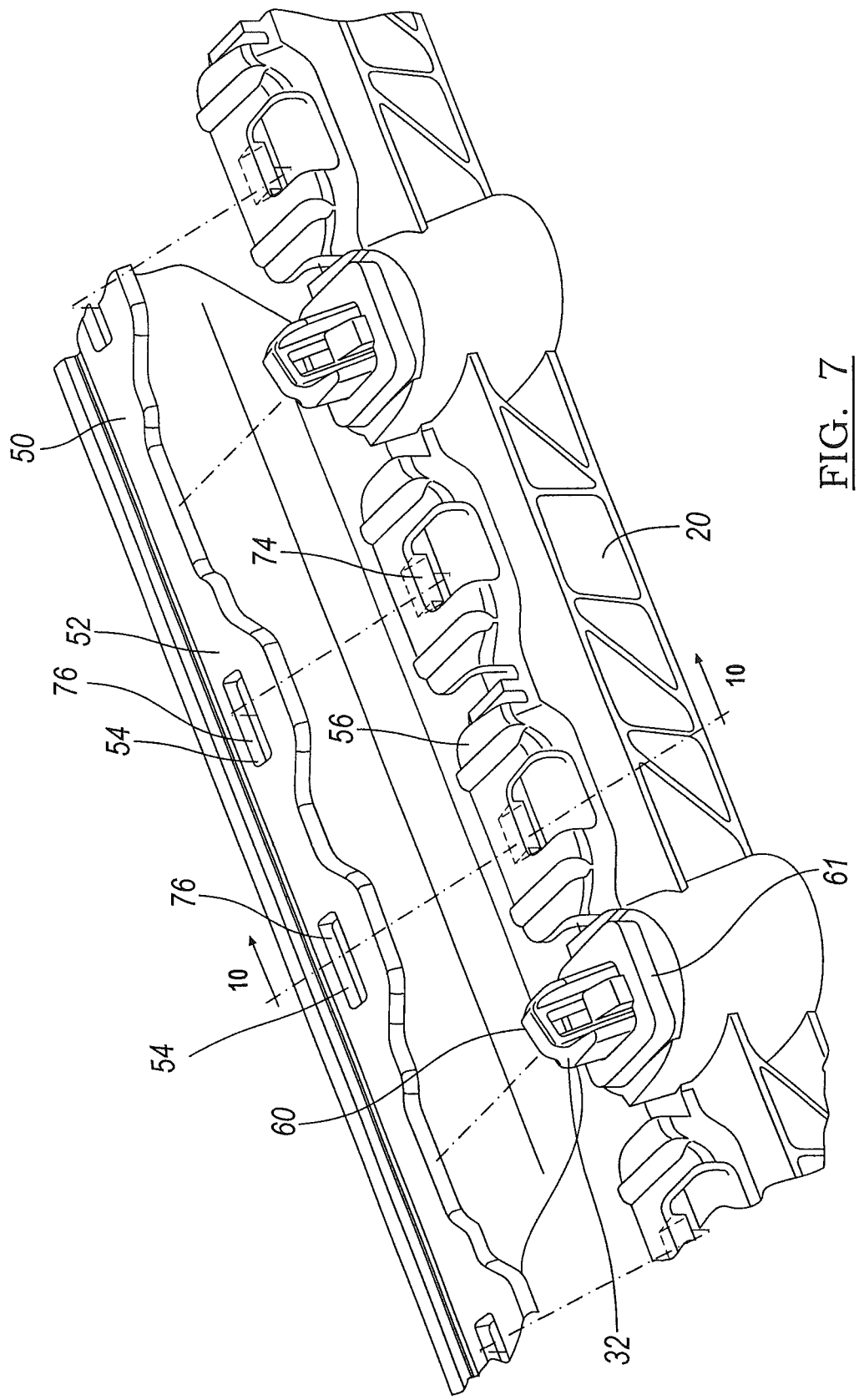
FIG. 7 is a perspective view of another mounting portion wherein the clip main body is mounted on the depression longitudinal wall (the side wall of the auto body)

FIGS. 6 and 7 represent the first step in the coupling of the fascia component 22 to the vehicle body 24. Disposed along an interior edge 71 of the fascia attachment clip 20 is the plurality of snap clip elements 56. These elements 56 are configured to engage and lock onto the plurality of coupling tab structures 52 defined on the fascia component 22.

Associated with the plurality of snap clip elements 56 is a deformable tooth member 70 which is elastically deformable so as to allow it to engage the aperture 54 defined within the coupling flange 50. The locking tooth 70 can have a ramped surface 72 and a generally perpendicular locking surface 74 which engages a locking surface 76 in the aperture 54. The coupling apertures 54 are sized so as to allow relative translation of the fascia attachment clip 20 with respect to the fascia component 22.

Figure 8:
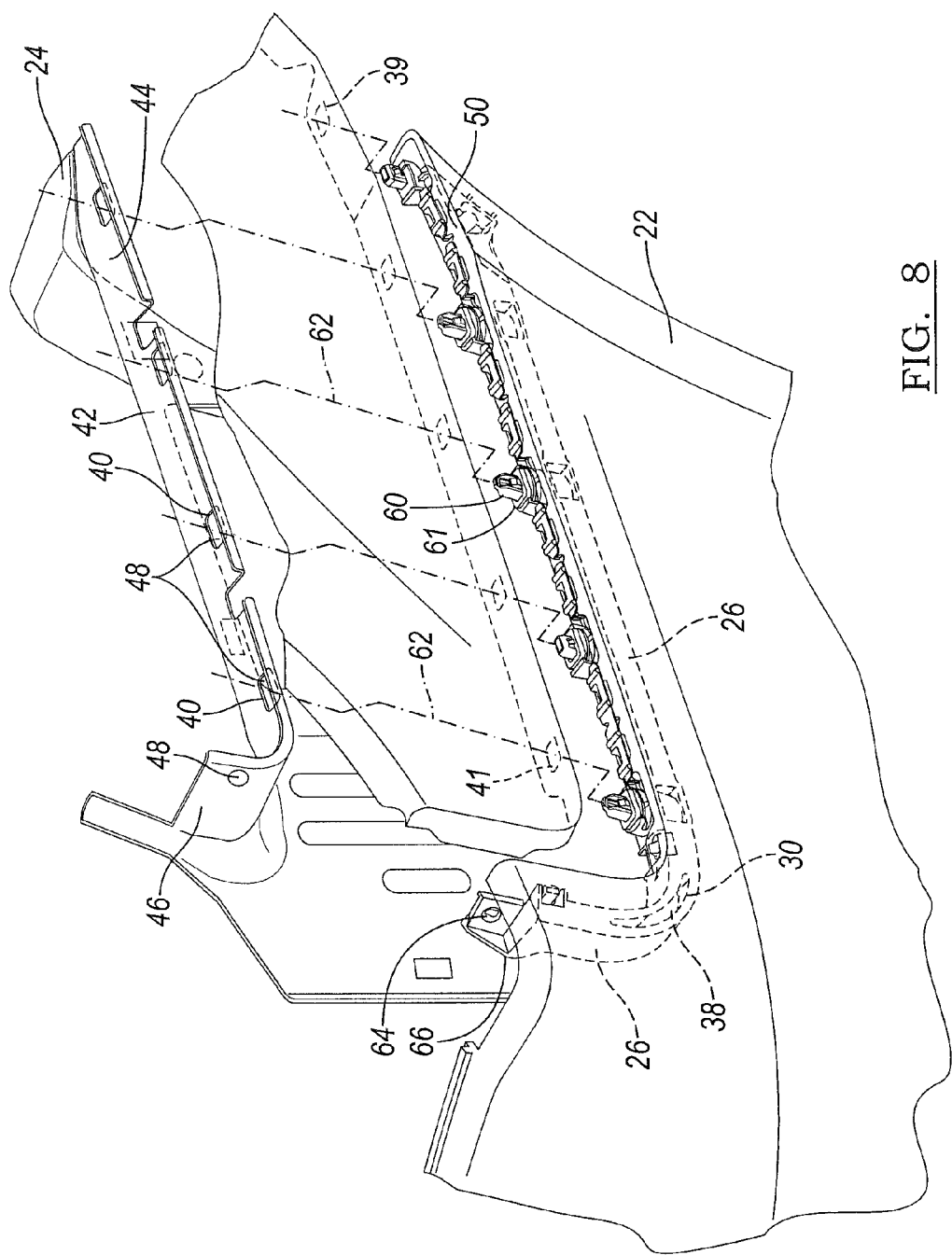
FIG. 8 is a perspective exploded view illustrating a rear fascia mounted on the depression longitudinal wall (the side wall of the auto body) by a locking piece.
Figure 9:
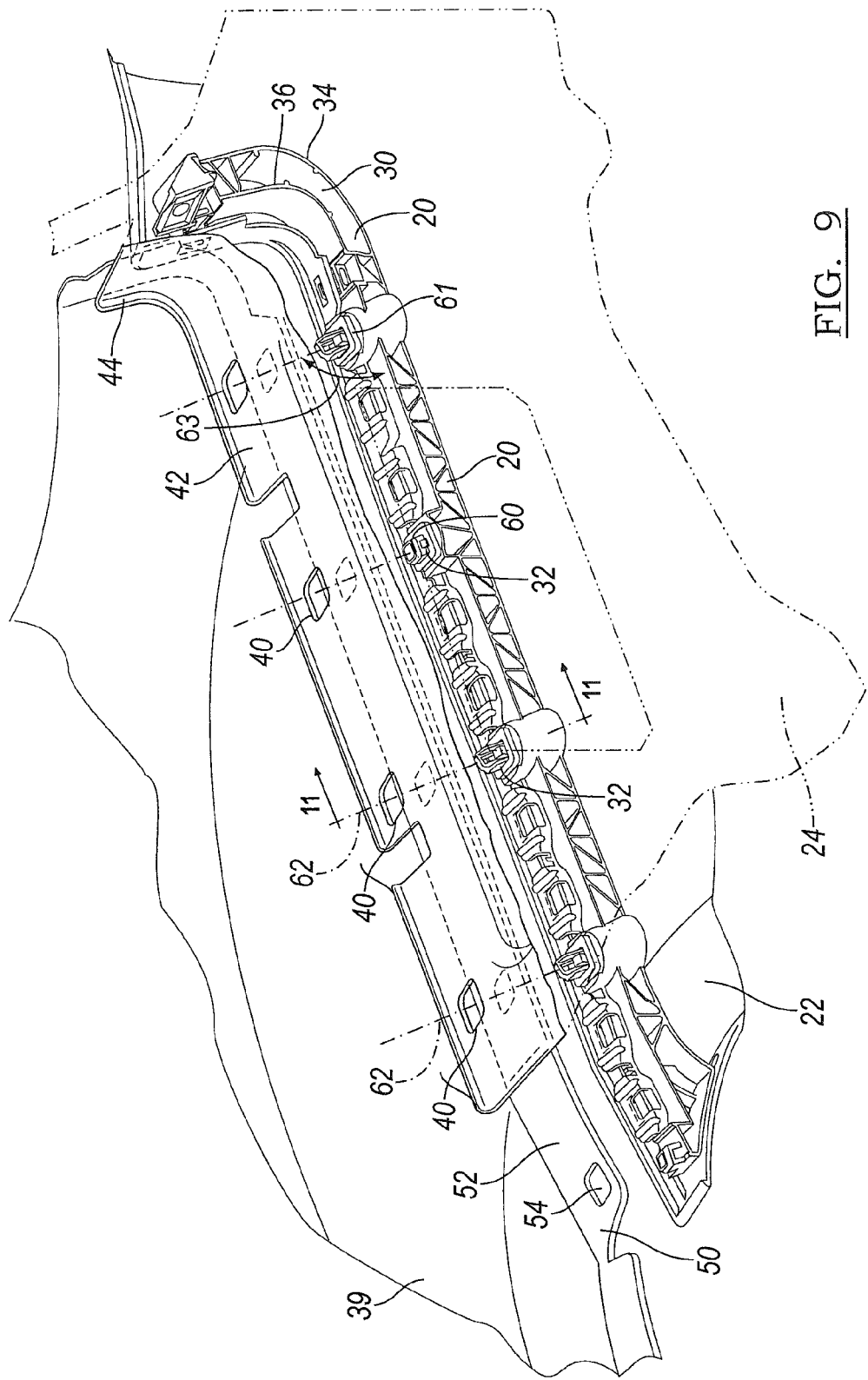
FIG. 9 is an internal view of the coupling of the fascia and clip to the sheet metal.

FIGS. 8 and 9 represent the coupling of the coupling component/trim fascia subassembly to the vehicle. The sheet metal apertures 41 are aligned with the apertures 40 defined in the vehicle body 24. The polygonal coupling attachment parts 32 are aligned with the apertures 40, 41. The trim fascia attachment clip 20 is then translated along the line of symmetry 62 of the polygon 32 coupling members. This sandwiches a sheet metal trim flange between the fascia component 22 and the vehicle body 24.

Figure 10:
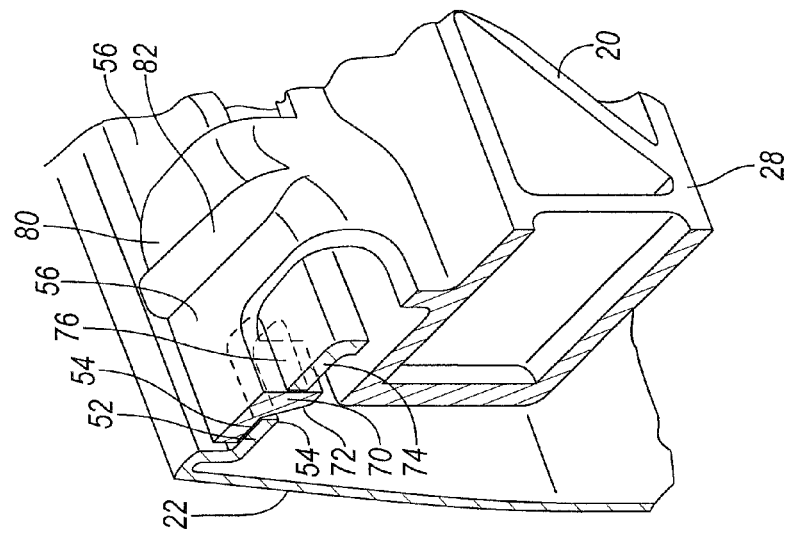
FIG. 10 represents a sectional view of the clip being coupled to the fascia component.

FIG. 10 is a cross-sectional view of the fascia component 22, fascia attachment clip 20 subassembly. Shown is the second portion 28 which can be a hollow box section. Also shown is the snap locking element 56. This feature has a cantilevered locking flange 80 having a stiffening rib 82. Coupled to the cantilevered locking flange 80 is the locking member 70 having the ramped surface 72. Also shown is the perpendicular locking surface 74. This locking surface 74 is configured to engage the locking surface 76 in the coupling aperture 54 of the fascia tab structure 52.

Figure 11:
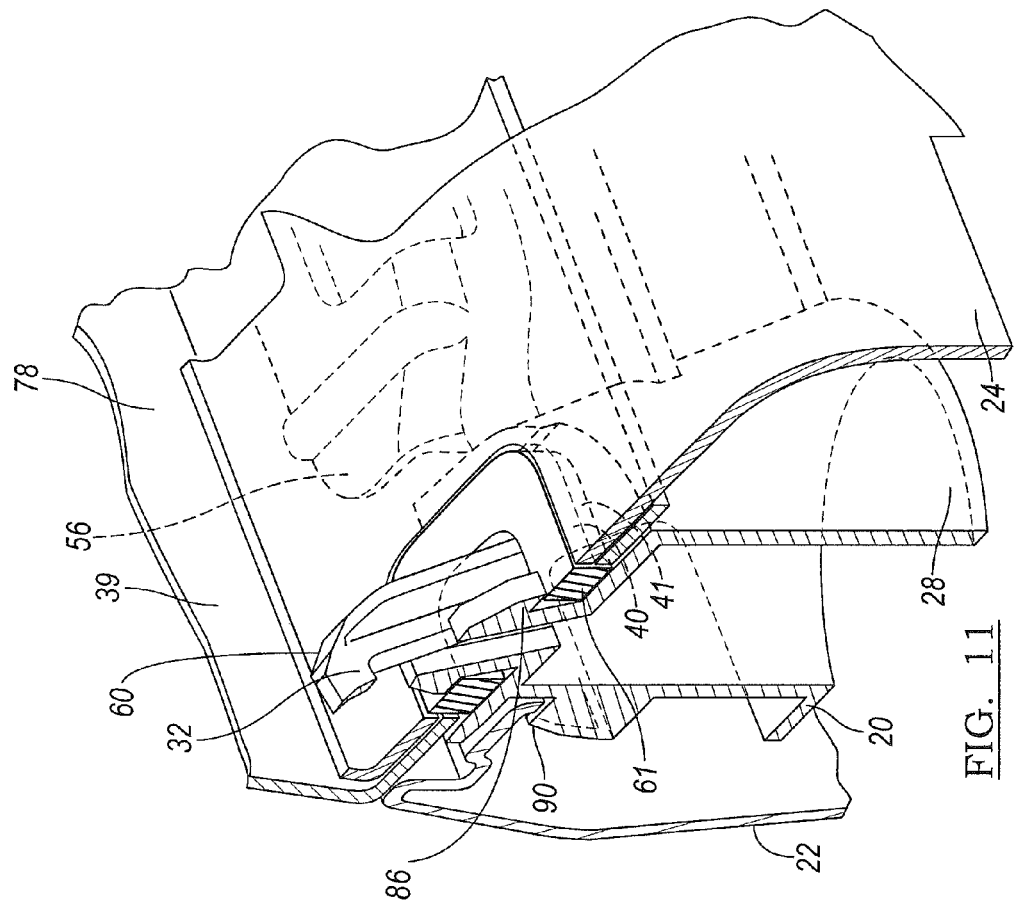
FIG. 11 represents a sectional view of the clip being coupled to the vehicle component.

FIG. 11 depicts the coupling of the fascia component 22 fascia attachment clip 20 subassembly with the vehicle body 24. Shown is polygonal attachment flange 32 disposed through the sheet metal and vehicle body apertures, 41 and 40, respectively. The polygonal coupling flange 32 has a locking snap flange 86 configured to deform upon insertion and engage a portion of the vehicle body 24 upon relaxation. As shown, disposed between the fascia attachment clip 20 and the vehicle body 24 is the sheet metal portion 39 of the vehicle. Spacing between the fascia component 22 and the sheet metal portion 39 is controlled by a coupling groove 90 defined in the fascia attachment clip 20.

FIGS. 12 and 13 represent first and second sections 26, 28 being generally positioned at an acute angle with respect to each other. Disposed between the first and second sections 26, 28 is the elastic portion 30 defined by the pair of deformable bodies 34, 36. At a first end 92 of the second section 28 is a coupling fastener configured to couple the fascia attachment clip 20 to a wheel well component.

Also shown is the plurality of snap locking elements 56 which function to couple the fascia component 22 to the fascia attachment clip 20, and the polygon attachment flanges 32 disposed on the top surface of the fascia attachment clip 20 at the non-perpendicular angle 63.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A fascia attachment clip for attaching and fixing a fascia to a vehicle body, comprising:
    first and second sections, and an elastic portion integrally formed between the first and second sections, said elastic portion being elastically deformable to allow rotation and translation of the first section with respect to the second section; and
    first and second coupling mechanisms coupled to the first and second sections for attaching the fascia to the vehicle body;
    wherein the first and second coupling mechanisms have an angle of symmetry which is at a non-perpendicular angle to the second section.

2. A fascia attachment clip according to claim 1, wherein the first and second coupling mechanisms are snap fit components configured to mate with attachment holes provided on the vehicle body.

3. The fascia attachment clip according to claim 1, wherein the elastic portion comprises a pair of deformable planar members defining an aperture there between.

4. The fascia attachment clip according to claim 1, wherein the elastic portion comprises a pair of curved plate-shaped bodies.

5. The fascia attachment clip according to claim 1, wherein said elastic portion is configured to allow the first and second sections to rotate relative to one another to compensate for dimensional variations in at least one of a fascia, a vehicle body and a fascia attachment clip.

6. The fascia attachment clip according to claim 1, wherein said first coupling mechanism comprises a plurality of attachment components and further wherein each attachment component defines a plurality of deformable locking claws extending laterally from a flange.

7. The fascia attachment according to claim 1, wherein the first coupling mechanism defines a locking tooth.

8. The fascia attachment clip according to claim 1, wherein the elastic portion defines an aperture.

9. The fascia attachment clip according to claim 1, wherein the second coupling mechanism is configured to be disposed within an aperture defined in a sheet metal component.

10. The fascia attachment clip according to claim 1, wherein the first section and the second section are disposed at an acute angle with respect to each other.

11. A fascia attachment clip for attaching and fixing a fascia to a vehicle body, comprising:
    first and second sections, and an elastic portion integrally formed between the first and second sections, said elastic portion being elastically deformable to allow rotation and translation of the first section with respect to the second section; and
    first and second coupling mechanisms coupled to the first and second sections for attaching the fascia to the vehicle body;
    wherein the second section comprises a coupling portion defining a plurality of locking elements configured to accept a plurality of tabs defined on the fascia, and further wherein the tabs define apertures.

12. A fascia attachment clip for attaching and fixing a fascia having a first coupling flange to a vehicle body having a second coupling flange defining attachment holes, the fascia attachment clip comprising:
- first and second sections, the first section defining a longitudinal axis, and the second section being positioned at an acute angle relative to said longitudinal axis, the first section having a plurality of attachment members configured to be inserted into the attachment holes in the second coupling flange of the vehicle body; and
- an elastic section situated between the first and second sections to allow relative rotation between the first and second sections;
- wherein said plurality of attachment members extend from said first section at a non-perpendicular angle relative to said longitudinal axis; and further
- wherein said first section has a plurality of locking elements extending laterally from an interior surface configured to snap fit into attachment holes defined by the first coupling flange of the fascia.

13. The fascia attachment clip according to claim 12, wherein the elastic part comprises by elastically deformable plate-shaped bodies.

14. The fascia attachment clip according to claim 13, wherein the elastic part comprises a pair of curved plate-shaped bodies defining an arcuate aperture therebetween.

15. The fascia attachment clip according to claim 12, wherein said elastic part is configured to allow the first and second sections to rotate relative to one another an amount to compensate for dimensional variations in at least one of the fascia, the vehicle body and the fascia attachment clip and allow coupling thereof.

16. The fascia attachment clip according to claim 12, wherein each locking element comprises a deformable locking claw extending laterally from an interior flange.

17. The fascia attachment clip according to claim 16, wherein each locking element defines a locking tooth.

18. The fascia attachment clip according to claim 12, wherein the first and second coupling flanges are L-shaped.

19. The fascia attachment clip according to claim 12, wherein said plurality of attachment members extend from said first section at said acute angle relative to said longitudinal axis so as to extend substantially parallel to said second section.

* * * * *